(No Model.)

J. L. KEAGLE.
DRAFT ATTACHMENT FOR FARM IMPLEMENTS.

No. 538,376. Patented Apr. 30, 1895.

Witnesses.
A. B. Vist
Tad A. Bailey

Inventor.
Joseph L. Keagle.
by his Atty N. DuBois.

UNITED STATES PATENT OFFICE.

JOSEPH L. KEAGLE, OF SPRINGFIELD, ILLINOIS.

DRAFT ATTACHMENT FOR FARM IMPLEMENTS.

SPECIFICATION forming part of Letters Patent No. 538,376, dated April 30, 1895.

Application filed January 14, 1895. Serial No. 534,881. (No model.)

*To all whom it may concern:*

Be it known that I, JOSEPH L. KEAGLE, a citizen of the United States, residing at Springfield, in the county of Sangamon and State of Illinois, have invented a certain new and useful Improvement in Draft Attachments for Farm Implements, of which the following is such a full, clear, and exact description as will enable those skilled in the art to which it pertains to make and use my said invention.

The purposes of my invention are to provide means adapted to connect the tongue and the double-trees with the implement in such manner as to avoid side draft when three or more horses abreast are hitched to the implement, also to provide simple and effective means whereby the horses may be kept in proper position relative to each other and relative to the implement or the machine.

My invention consists of certain novel features of construction and combinations of parts illustrated in the accompanying drawings to which reference is hereby made and hereinafter particularly described and specifically claimed.

I have shown and herein describe my draft attachment in its preferable form as applied to a gang plow, though it may be applied to a harvester or other implements without departing from the spirit of my invention.

Figure 3:
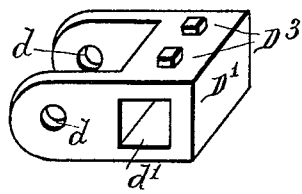
Figure 1:
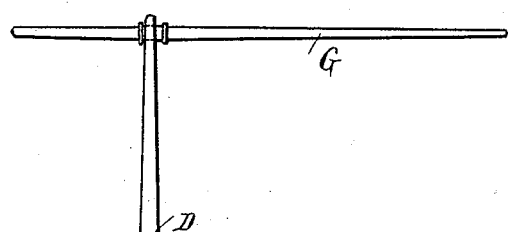
Figure 1:
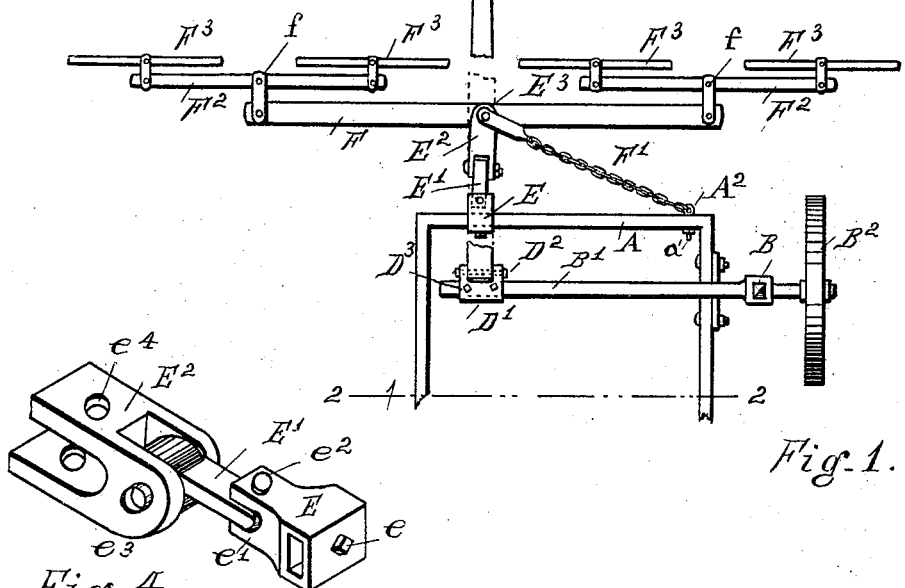
Figure 4:
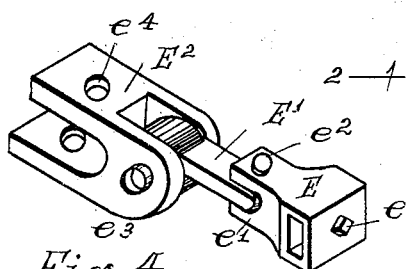
Figure 2:
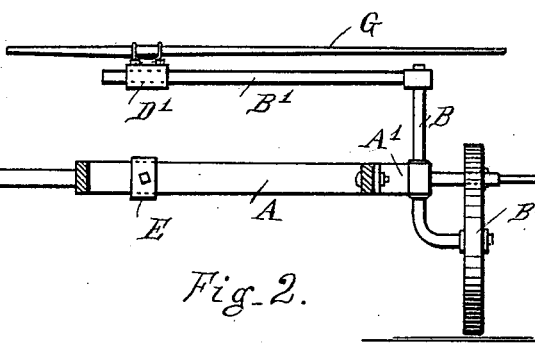

Figure 1 is a top plan of the complete mechanism. Fig. 2 is a vertical transverse section on the line 2 of Fig. 1. Fig. 3 is an enlarged detached perspective view of the block on the tiller-arm which connects the tongue with the tiller-arm. Fig. 4 is an enlarged detached perspective view of the mechanism connecting the draft-bar with the main frame of the implement.

Similar letters indicate like parts in all of the views.

In the drawings I have illustrated only so much of the frame work of the plow as is necessary to show the connection of my draft attachment therewith.

The main frame A of the plow may be of any usual and well known form. Secured to the frame A is a bracket A' in which a shaft B turns. The shaft B is bent outward at its lower end and the tiller wheel $B^2$ turns on the shaft B. The arm B' is secured to the upper end of the shaft B. The block D' has a central opening $d'$ in which the arm B' fits, and the block may be moved on the arm and clamped in any suitable position thereon by means of the set screws $D^3$. The tongue D fits in the fork in the block D' and is retained therein by the bolt $D^2$ passing through the holes $d$ in the block and through the tongue. The slide E (see Fig. 4) fits on the frame A and may be placed in any desired position on the front cross piece of the frame and clamped in position by means of the set screw $e$. In the front end of the slide E is a fork $e'$ adapted to receive one end of the link E'. The bolt $e^2$ passes through the slide E and the link E' and connects the link with the slide. The clevis $E^2$ is connected with the front end of the link E' by a bolt $e^3$ which passes through the clevis and through a horizontal hole near the end of the link.

The draft bar F fits in the fork in the front end of the clevis $E^2$ $E^2$. A bolt $E^3$ passes through the holes $e^4$ in the clevis and through the draft bar and connects the draft bar with the clevis. By means of the clevis $E^2$ and the link E' the draft bar F is connected with the block E in such manner that it may be turned up or down or to the right or to the left at pleasure, thus forming a universal joint between the draft bar and the slide. An adjustable bolt $A^2$ is connected with the front cross piece of the frame A. This bolt is of such length that it may be moved outward or inward to adjust the stay chain F' as hereinafter explained.

One end of the chain F' is connected with the bolt $E^3$ and the other end is connected with the bolt $A^2$ in any suitable and convenient manner. The double-trees $F^2$ are of the usual well known form and are connected with the draft bar F by straps $f$ or clevises of the usual well known form. The single-trees $F^3$ are of the usual form and may be connected with the double-trees in any suitable and convenient way. Where my draft attachment is used on a gang plow I use the neck yoke G, the form of which is clearly shown in Figs. 1 and 2.

The draft attachment illustrated in the drawings is intended to be used with four horses hitched to a gang plow. When the horses are hitched four abreast it is desirable that when breaking ground three of the horses should walk on the sod and the fourth or right hand horse in this case should walk in the furrow directly in front of the tiller wheel B². This tiller-wheel runs in the furrow last plowed, and this furrow makes a path which the right hand horse will follow without guidance. It is therefore desirable that the guide horse, in this case the right hand horse, should be so connected with the other horses that he may to some extent control their movements thereby relieving the driver to some extent from the care of the team and permitting him to give closer attention to the operation of the plow or other implement. I attain this end by employing a neck yoke longer than is commonly used and placing the loop on the neck yoke which supports the tongue at a distance from one end of the neck yoke equal to one third the length thereof. The longer or right hand end of the neck yoke is then connected with the right hand horse walking in the furrow in front of the tiller-wheel. The other end of the neck yoke is then connected with the right hand or off horse of the team on the left hand side of the tongue. It is obvious that by connecting the furrow horse with the horse on the left hand side of the tongue the former will to a great extent control the movements of the latter and these two will control the movements of the horse which is between them. The extreme left hand horse is reined to the left hand horse adjacent to the tongue and the movement of the former is controlled by the latter.

In many farm implements, particularly plows and harvesters, great difficulty is experienced where three or more horses are worked together in hitching the horses to the machine in such manner as to avoid side draft and distribute equally among the horses the load which is to be pulled. It is the main purpose of my invention to obviate this objection, and to that end I employ the means which I have already described in a manner which I will now explain. The block D' slides on the arm B' and permits lateral adjustment of the tongue so as to bring the right hand horse in the furrow as described.

The slide E is adjustable on the main frame so that the power may be applied at any desired point necessary to avoid side draft. The draft bar is also adjustable relative to the frame by means of the chain F' and the bolts A². The chain F' may be lengthened so as to permit the draft bar F to be moved to the left by loosening the nut a' on the bolt A² so as to permit the bolt to be drawn outward, or the chain may be shortened to adjust the draft bar to the right by tightening up the nut a' so as to draw the bolt A² inward.

The draft bar F is centrally pivoted in the clevis so that the double trees are equally distant from the center and a team hitched thereto may draw equal shares of the load.

When the draft attachment is connected with the implement as shown in Fig. 1, the line of draft passes through the center of the bolt E³ and slightly to the right of the center of the slide E. If when the draft attachment is attached in this position there is side draft to the right a nut on the bolt A² would be screwed up so as to draw the chain F' slightly to the right thereby moving the line of draft somewhat to the right so as to obviate the side draft. On the contrary if the side draft should be to the left the chain would be lengthened so as to shift the line of draft to the left in an obvious manner. By means of this mechanism adjustable as described, the side draft which it may be desired to overcome is distributed equally among all the horses hitched to the draft attachment, whereas the practice has heretofore been to throw the excess of draft on one or more horses of the team instead of distributing it equally among all of the horses.

By making the tongue adjustable on the arm B' it is obvious that the tongues may be adjusted on the arm so as to accommodate one or two horses as may be desired on each side of the tongues. In using my draft attachment on a harvester the shaft B and the tiller wheel B² need not necessarily be used. It is only necessary for the purpose of connecting my draft attachment with a harvester that a suitable equivalent for the arm B' be connected with and supported on the main frame so as to permit lateral adjustment of the tongue.

Having fully described my invention, what I claim as new, and desire to secure by Letters Patent, is—

1. A draft attachment consisting of a draft bar connected at its center by a universal-joint connection with a slide adjustable on the main frame of an implement, a chain connectible with the center of said draft bar and with the main frame of the implement and adapted to be lengthened or shortened to simultaneously change the line of draft of the draft bar and of all of the double-trees and single-trees connected therewith, as set forth.

2. A draft attachment consisting of a tongue laterally adjustable a slide on the main frame laterally adjustable, a draft bar pivotally connected with said slide, a chain adapted to adjustably connect the draft bar with the main frame of the implement, double-trees connected with said draft bar and single trees connected with said double-trees, as set forth.

3. A draft attachment consisting of a laterally adjustable tongue a neck yoke connected with said tongue and extending in one direction two thirds of and in the other direction one third of the length of said neck yoke, a laterally adjustable slide, a draft bar pivotally connected with said slide, an adjustable chain connected with said draft bar, and double-trees and single-trees connected with said draft bar, as set forth.

4. In a draft attachment for farm implements, the combination of the slide E adjustable on the main frame of the implement, the clevis E², the draft bar supported in said clevis, the link connecting the clevis with the slide, the bolt connecting the draft bar with the clevis, the chain connected with the clevis, the bolt adjustably connecting the chain with the main frame, and the double-trees and single-trees connected with the draft bar, as set forth.

5. In a draft attachment for farm implements the block D' adjustable on a horizontal arm, the tongue pivotally connected with said block, the neck yoke connected with said tongue, as set forth, the slide laterally adjustable on the main frame, the link connecting the slide with the clevis, the clevis supporting the draft bar, the chain connected with the clevis and adapted to be adjustably connected with the frame of the implement, the draft bar supported in the clevis and the double trees and single trees connected with said draft bar, as set forth.

6. A draft attachment for gang plows and the means for connecting same with the main frame, consisting of the block laterally adjustable on the main frame, the draft bar having a pivotal connection with said slide, the single-trees and double-trees connected with said draft bar, the adjusting chain connecting the draft bar with the main frame, the laterally adjusting tongue, the neck yoke connectible with the tongue as set forth, in combination with the main frame, the brackets secured to the main frame, the bent shaft turning in said bracket, the tiller wheel on the lower end of said shaft, and the arm connected with the upper end of said shaft, adapted to support the tongue, as set forth.

In witness whereof I have hereunto subscribed, at Springfield, Illinois, this 24th day of December, 1894.

JOSEPH L. KEAGLE.

Witnesses:
T. C. MATHER,
G. W. KEAGLE.